United States Patent
Grey (10) Patent No.: US 10,884,516 B2
(45) Date of Patent: Jan. 5, 2021

(54) OPERATION AND CONTROL APPARATUS AND CONTROL METHOD

(71) Applicant: Corsair Memory, Inc., Fremont, CA (US)

(72) Inventor: Michael Grey, Fremont, CA (US)

(73) Assignee: Corsair Memory, Inc., Fremont, CA (US)

(*) Notice: Subject to any disclaimer, the term of this patent is extended or adjusted under 35 U.S.C. 154(b) by 29 days.

(21) Appl. No.: 16/253,731

(22) Filed: Jan. 22, 2019

(65) Prior Publication Data

US 2019/0227645 A1 Jul. 25, 2019

(30) Foreign Application Priority Data

Jan. 23, 2018 (CN) .......................... 2018 1 0064128

(51) Int. Cl.
*G06F 3/0354* (2013.01)
*G06F 3/02* (2006.01)

(52) U.S. Cl.
CPC ........ *G06F 3/03547* (2013.01); *G06F 3/0213* (2013.01)

(58) Field of Classification Search
CPC .... G06F 3/03547; G06F 3/0213; G06F 3/038; G06F 3/04847; G06F 3/04883; A63F 13/24; A63F 13/214
See application file for complete search history.

(56) References Cited

U.S. PATENT DOCUMENTS

| | | | | |
|---|---|---|---|---|
| 5,903,229 A | * | 5/1999 | Kishi | G06F 3/04883 178/19.01 |
| 6,287,198 B1 | * | 9/2001 | McCauley | A63F 13/04 463/37 |
| 6,540,144 B1 | * | 4/2003 | Hudrick | G06F 3/002 235/462.15 |
| 7,054,965 B2 | * | 5/2006 | Bell | G06F 1/1626 345/1.1 |
| 8,013,837 B1 | * | 9/2011 | Schroeder | G06F 3/011 345/157 |
| 8,381,135 B2 | * | 2/2013 | Hotelling | G06F 3/04883 715/863 |
| 8,471,814 B2 | * | 6/2013 | LaFave | G06F 3/0488 345/160 |
| 8,527,894 B2 | * | 9/2013 | Hughes | G06F 3/0236 715/773 |

(Continued)

*Primary Examiner* — Amy Onyekaba
(74) *Attorney, Agent, or Firm* — Harness, Dickey & Pierce, P.L.C.

(57) ABSTRACT

The present invention discloses an operation and control apparatus for operating and controlling a personal computer and a control method therefor. The operation and control apparatus includes a touch unit and a control unit. The touch unit includes a touchpad, configured to sense an external tap behavior. The control unit includes a control module electrically connected to the touchpad and a memory module electrically connected to the control module. The memory module is configured to store at least one initial coordinate. The control module obtains the external tap behavior sensed by the touchpad, to generate a tap coordinate. The control module analyzes a position of the tap coordinate by using the initial coordinate as a basis point, to generate a control instruction for operating and controlling the personal computer.

10 Claims, 4 Drawing Sheets

(56) References Cited

U.S. PATENT DOCUMENTS

| | | | |
|---|---|---|---|
| 9,533,223 B2* | 1/2017 | Champagne | A63F 13/245 |
| 10,191,714 B2* | 1/2019 | Wiggemans | A63F 13/23 |
| 2004/0009788 A1* | 1/2004 | Mantyjarvi | G06F 3/04886 |
| | | | 455/550.1 |
| 2004/0263477 A1* | 12/2004 | Davenport | G06F 3/0383 |
| | | | 345/163 |
| 2005/0057489 A1* | 3/2005 | Kung | G06F 1/1616 |
| | | | 345/156 |
| 2006/0109251 A1* | 5/2006 | Kelly | G06F 3/038 |
| | | | 345/168 |
| 2006/0132460 A1* | 6/2006 | Kolmykov-Zotov | |
| | | | G06F 3/04812 |
| | | | 345/173 |
| 2006/0209014 A1* | 9/2006 | Duncan | G06F 3/04883 |
| | | | 345/156 |
| 2007/0100523 A1* | 5/2007 | Trachte | D03D 7/00 |
| | | | 701/41 |
| 2007/0257891 A1* | 11/2007 | Esenther | G06F 3/04883 |
| | | | 345/173 |
| 2008/0036743 A1* | 2/2008 | Westerman | G06F 3/0488 |
| | | | 345/173 |
| 2008/0088597 A1* | 4/2008 | Prest | G06F 3/0338 |
| | | | 345/173 |
| 2008/0088600 A1* | 4/2008 | Prest | H01H 25/041 |
| | | | 345/173 |
| 2008/0165141 A1* | 7/2008 | Christie | G06F 3/0482 |
| | | | 345/173 |
| 2008/0174550 A1* | 7/2008 | Laurila | A63F 13/24 |
| | | | 345/158 |
| 2009/0122011 A1* | 5/2009 | Timokhin | G06F 3/038 |
| | | | 345/163 |
| 2009/0201248 A1* | 8/2009 | Negulescu | G06F 3/016 |
| | | | 345/157 |
| 2010/0044121 A1* | 2/2010 | Simon | G06F 3/0488 |
| | | | 178/18.03 |
| 2010/0137066 A1* | 6/2010 | Cheng | A63F 13/245 |
| | | | 463/37 |
| 2010/0148995 A1* | 6/2010 | Elias | G06F 3/0202 |
| | | | 341/22 |
| 2010/0164874 A1* | 7/2010 | Yeh | G06F 1/1613 |
| | | | 345/170 |
| 2010/0164880 A1* | 7/2010 | Huang | G06F 3/04886 |
| | | | 345/173 |
| 2011/0169734 A1* | 7/2011 | Cho | H04N 21/42222 |
| | | | 345/157 |
| 2012/0075187 A1* | 3/2012 | Lee | G06F 3/038 |
| | | | 345/163 |
| 2012/0096393 A1* | 4/2012 | Shim | G06F 3/0485 |
| | | | 715/784 |
| 2012/0113001 A1* | 5/2012 | Yamauchi | G06F 3/038 |
| | | | 345/157 |
| 2012/0120004 A1* | 5/2012 | Chang | G06F 3/041 |
| | | | 345/173 |
| 2012/0127206 A1* | 5/2012 | Thompson | G06F 3/04883 |
| | | | 345/661 |
| 2013/0132856 A1* | 5/2013 | Binyamin | G06F 3/017 |
| | | | 715/740 |
| 2013/0201130 A1* | 8/2013 | Uchiyama | G06F 3/0418 |
| | | | 345/173 |
| 2014/0062914 A1* | 3/2014 | Lin | G06F 3/0485 |
| | | | 345/173 |
| 2014/0139437 A1* | 5/2014 | Chao | G06F 3/023 |
| | | | 345/168 |
| 2014/0198044 A1* | 7/2014 | Wang | G06F 3/038 |
| | | | 345/163 |
| 2014/0213354 A1* | 7/2014 | Chen | A63F 13/06 |
| | | | 463/31 |
| 2014/0368455 A1* | 12/2014 | Croisonnier | G06F 3/0447 |
| | | | 345/173 |
| 2015/0042563 A1* | 2/2015 | Tsukahara | G06F 3/0346 |
| | | | 345/157 |
| 2015/0138085 A1* | 5/2015 | Wilk | G06F 3/0304 |
| | | | 345/158 |
| 2015/0220182 A1* | 8/2015 | Avrahami | G06F 3/03547 |
| | | | 345/163 |
| 2015/0286295 A1* | 10/2015 | Pepe | G06F 3/03543 |
| | | | 345/163 |
| 2016/0085437 A1* | 3/2016 | Hamara | A63F 13/42 |
| | | | 463/29 |
| 2016/0110057 A1* | 4/2016 | Choi | G06F 3/0354 |
| | | | 345/158 |
| 2017/0011210 A1* | 1/2017 | Cheong | G06F 21/32 |
| 2017/0206054 A1* | 7/2017 | Wiggemans | G06F 3/162 |
| 2017/0228123 A1* | 8/2017 | Ghassabian | G06F 3/0236 |
| 2017/0255236 A1* | 9/2017 | Oreyang | G06F 3/03547 |
| 2017/0269897 A1* | 9/2017 | Wiggemans | A63F 13/23 |
| 2017/0280533 A1* | 9/2017 | Dimberg | G05G 1/08 |
| 2018/0012419 A1* | 1/2018 | McGrath | A63F 13/428 |
| 2018/0021672 A1* | 1/2018 | Baba | A63F 13/5375 |
| | | | 463/31 |
| 2018/0028917 A1* | 2/2018 | Poerschke | A63F 13/837 |
| 2018/0275783 A1* | 9/2018 | Thompson | G06F 3/03547 |
| 2019/0102082 A1* | 4/2019 | Kuoch | G06F 3/0416 |

* cited by examiner

OPERATION AND CONTROL APPARATUS AND CONTROL METHOD

CROSS-REFERENCE TO RELATED APPLICATIONS

The present application claims the benefit of Chinese Patent Application Serial No. 201810064128.2 filed Jan. 23, 2018 and entitled "Control Device and Its Control Method," which is hereby incorporated by reference in its entirety.

FIELD

The present invention relates to an operation and control apparatus, and in particular, to an operation and control apparatus applicable to personal computer operation and control and a control method therefor.

BACKGROUND

A mouse and a keyboard are apparatuses for operating and controlling a personal computer and are very familiar to people. Many computer games are also operated and controlled by using the mouse and the keyboard. The mouse and the keyboard are very popular computer control apparatuses.

Another computer control apparatus is a touchpad. A main function of the touchpad is serving as a mouse apparatus to control a mouse in a personal computer. However, an operation manner of the touchpad is inconvenient, and most people replace a mouse apparatus with a touchpad only when there is no mouse apparatus.

Therefore, many personal computer games do not support operation and control by using a touchpad, and simply link a touchpad control instruction to a mouse apparatus control instruction, to control a mouse in a personal computer. Therefore, the touchpad cannot effectively control an average personal computer game, and usually a game player does not use the touchpad as an operation and control apparatus for operating and controlling the personal computer game.

Therefore, how to enable a touchpad to simulate various game operation and control apparatuses, to support operation and control of a personal computer game, and how to enable a game player to completely operate and control the personal computer game by using the touchpad are objectives that related technical personnel urgently need to strive for.

BRIEF DESCRIPTION OF THE DRAWINGS

For a better understanding of the aspects of the invention as well as additional aspects and embodiments thereof, reference should be made to the Description of Embodiments below, in conjunction with the following drawings in which like reference numerals refer to corresponding parts throughout the figures.

LIST OF REFERENCE NUMERALS

A: External tap behavior; 2: Personal computer; 31: Touch unit; 311: Touchpad; 32: Control unit; 321: Control module; 322: Memory module; 33: Keyboard unit; 331: Keyboard matrix; 34: Auxiliary unit; 341: Auxiliary key; 342: Auxiliary scroll wheel; 343: Auxiliary thumbstick; 41: Initial coordinate; 42: Tap information; 43: Tap coordinate; 44: Control instruction; 45: Central point coordinate; 46: Central axis coordinate; 901 to 906: Steps.

DETAILED DESCRIPTION

Patent characteristics and technical content of the related application in the present invention may be clearly presented in detailed descriptions of the preferred embodiment that are provided with reference to the drawings. Before the detailed descriptions are provided, it should be noted that similar components are represented by using a same reference numeral.

According to certain embodiments, a control method for an operation and control apparatus is configured to sense an external tap behavior to operate and control a personal computer. The method includes a setting step, an initial step, a sensing step, a comparison step, and a control step.

According to certain embodiments, first, the setting step of selecting a simulated operation and control mode based on a definition of a user is performed. Next, the initial step of virtualizing at least one initial coordinate on the operation and control apparatus is performed. Then, the sensing step of sensing, by the operation and control apparatus, the external tap behavior to generate tap information, and recording a position of the tap information to generate a tap coordinate is performed. Further, the comparison step of analyzing a position of the tap coordinate by using the initial coordinate as a basis point, and generating a control instruction is performed.

Finally, the control step of operating and controlling the personal computer by using the control instruction is performed.

Another technical means of the present invention is that, the foregoing control method for an operation and control apparatus further includes a repeated step, after the control step, of performing the sensing step again after a time interval.

Still another technical means of the present invention is that, in the comparison step, the tap coordinate may alternatively be the initial coordinate, and the control instruction is generated by using the initial coordinate as the basis point; and in the control step, a mouse operation and control mode is simulated by using the control instruction.

Yet another technical means of the present invention is that, in the initial step, the initial coordinate is a central point coordinate; in the comparison step, a tap coordinate relative to the central point coordinate is used as the control instruction; and in the control step, a thumbstick operation and control mode is simulated by using the control instruction.

Still yet another technical means of the present invention is that, in the initial step, the initial coordinate is a central axis coordinate; in the comparison step, a tap coordinate relative to the central axis coordinate is used as the control instruction; and in the control step, a steering wheel operation and control mode is simulated by using the control instruction.

Further another technical means of the present invention is that, in the setting step, the user selects one of the mouse operation and control mode, the thumbstick operation and control mode, and the steering wheel operation and control mode by using the personal computer.

Another objective of the present invention is to provide an operation and control apparatus, applicable to the foregoing control method for an operation and control apparatus. The operation and control apparatus is electrically connected to a personal computer, to sense an external tap behavior, and includes a touch unit and a control unit.

The touch unit includes a touchpad, configured to sense the external tap behavior.

The control unit includes a control module electrically connected to the touchpad, and a memory module electrically connected to the control module, where the control module obtains the external tap behavior sensed by the touchpad sense, to generate a tap coordinate, the memory module is configured to store at least one initial coordinate, the initial coordinate is one of the tap coordinate, a central point coordinate, and a central axis coordinate, the control module analyzes a position of the tap coordinate by using the initial coordinate as a basis point, to generate a control instruction for operating and controlling the personal computer.

Another technical means of the present invention is that, the operation and control apparatus further includes a keyboard unit, including a keyboard matrix electrically connected to the control module, where the keyboard matrix is configured to sense the external tap behavior, to enable the control module to control the personal computer.

Still another technical means of the present invention is that, the operation and control apparatus further includes an auxiliary unit. The auxiliary unit includes at least one auxiliary key electrically connected to the control module, an auxiliary scroll wheel electrically connected to the control module, and an auxiliary thumbstick electrically connected to the control module, where the auxiliary key, the auxiliary scroll wheel, and the auxiliary thumbstick are configured to sense the external tap behavior, to enable the control module to control the personal computer.

A beneficial effect of the present invention is that, the initial coordinate stored in the memory module is any one of the tap coordinate, a central point coordinate, and a central axis coordinate, so that the control module may analyze the position of the tap coordinate in the different operation and control modes by using the initial coordinate as the basis point, to generate the operation and control instruction, so that the user may select one of the mouse operation and control mode, the thumbstick operation and control mode, and the steering wheel operation and control mode, to control the personal computer.

Figure 1:
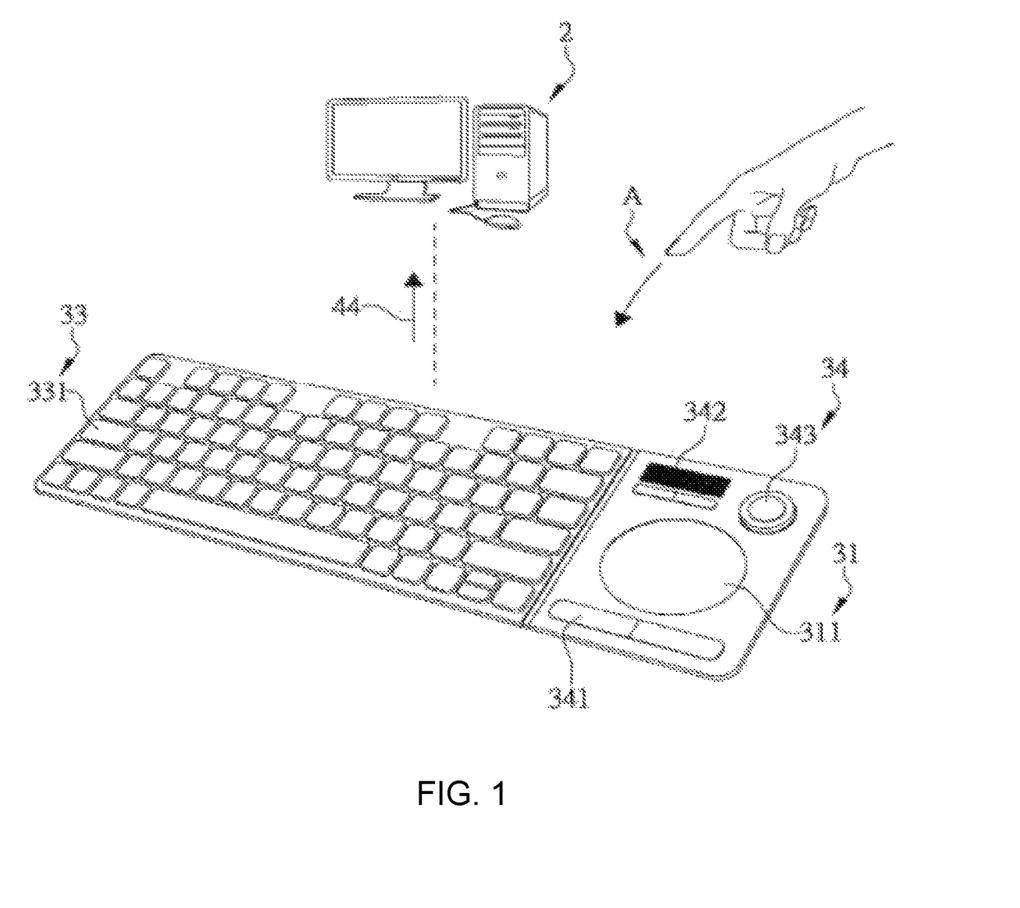
FIG. 1 is a schematic apparatus diagram, illustrating a preferred embodiment of an operation and control apparatus according to the present invention.
Figure 2:
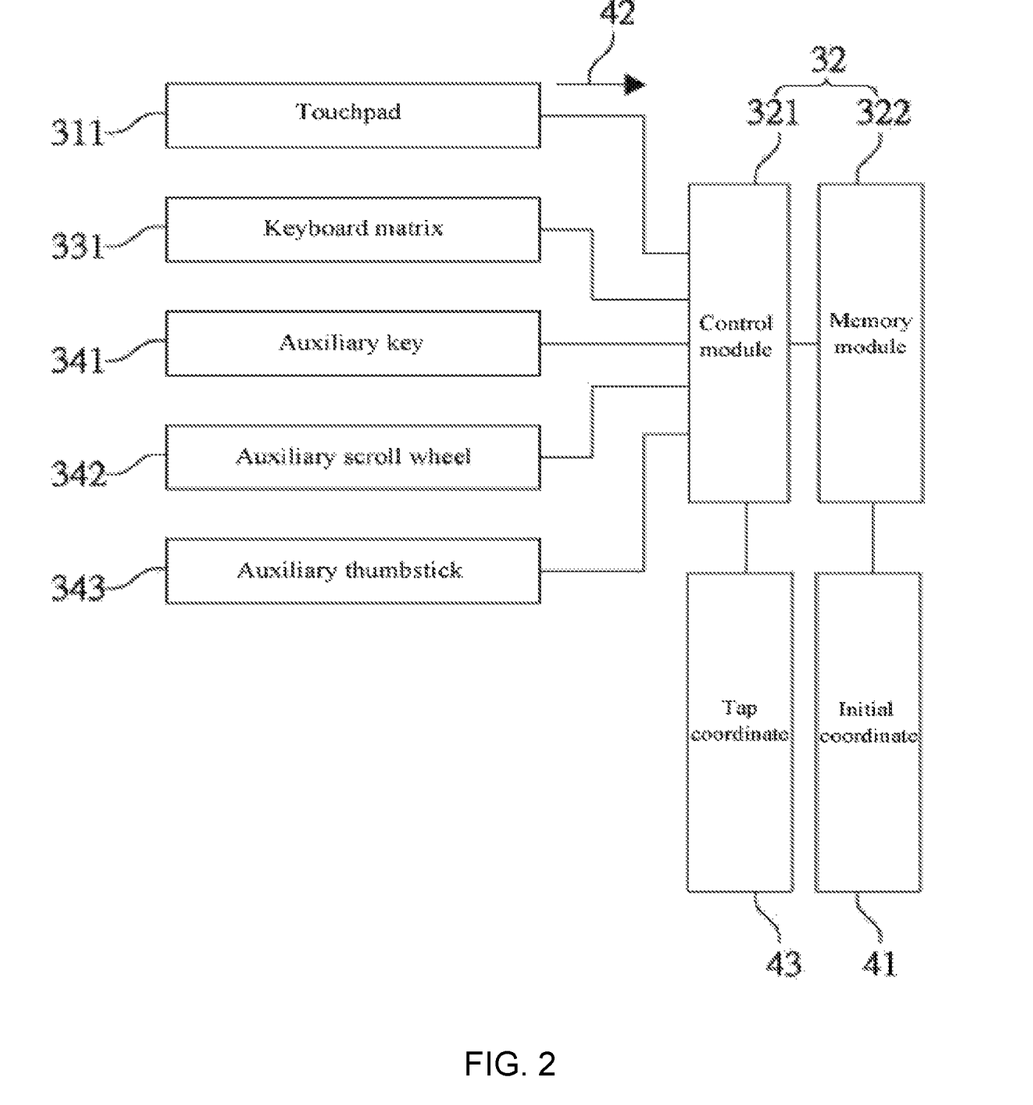
FIG. 2 is a schematic apparatus diagram, illustrating a control unit according to the preferred embodiment.

FIG. 1 and FIG. 2 are a preferred embodiment of an operation and control apparatus according to the present invention. The preferred embodiment is electrically connected to a personal computer 2, to sense an external tap behavior A to operate and control the personal computer 2. The operation and control apparatus includes a touch unit 31, a control unit 32, a keyboard unit 33, and an auxiliary unit 34.

The external tap behavior A (see FIG. 1) is a behavior or an action performed on the operation and control apparatus by a user, such as tap, pressing, or moving, and is used for operating and controlling the personal computer 2.

The touch unit 31 includes a touchpad 311, configured to sense the external tap behavior A. When the external tap behavior A taps the touchpad 311 or user's finger moves on the touchpad 311, a circuit in the touchpad 311 reacts, to detect a position of the external tap behavior A on the touchpad 311. A technology of controlling a computer through touch is already familiar to the industry, and is widely applied to a commercial product. Therefore, details are not described herein.

The control unit 32 (see FIG. 2) includes a control module 321 electrically connected to the touchpad 311, and a memory module 322 electrically connected to the control module 321. The control module 321 obtains the external tap behavior A sensed by the touchpad 311, to generate a tap coordinate 43 (see FIG. 2, FIG. 4, FIG. 5). The memory module 322 is configured to store at least one initial coordinate 41 (see FIG. 2, FIG. 4). The initial coordinate 41 is one of the tap coordinate 43, a central point coordinate 45 (see FIG. 5), and a central axis coordinate 46 (see FIG. 6). The control module 321 analyzes a position of the tap coordinate 43 by using the initial coordinate 41 as a basis point, to generate a control instruction 44 (see at least FIG. 1) for operating and controlling the personal computer 2.

After analyzing the position of the tap coordinate 43 by using the initial coordinate 41 as the basis point, and generating the control instruction 44, the control module 321 stores the tap coordinate 43 in the initial coordinate 41, and detects a new tap coordinate 43 again, so that the touchpad 311 may simulate a mouse operation and control mode.

Figure 5:
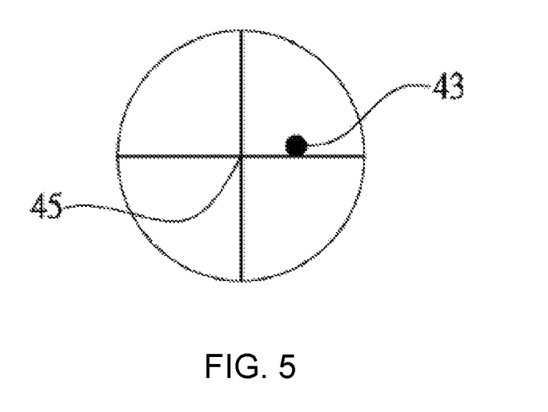
FIG. 5 is a schematic diagram, illustrating a pattern for thumbstick simulation according to the preferred embodiment.

When the central point coordinate 45 is used as a basis point for the initial coordinate 41, the generated control instruction 44 generated by analyzing the position of the tap coordinate 43 can enable the touchpad 311 to simulate a thumbstick operation and control mode.

Figure 6:
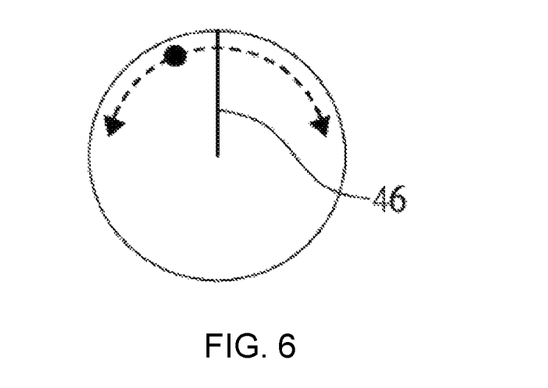
FIG. 6 is a schematic diagram, illustrating a pattern for steering wheel simulation according to the preferred embodiment.

When the central axis coordinate 46 is used as a basis point for the initial coordinate 41, the generated control instruction 44 generated by analyzing the position of the tap coordinate 43 can enable the touchpad 311 to simulate a steering wheel operation and control mode.

The control module 321 may receive an operation of the user, to set parameters of the operation and control apparatus, or select an operation and control mode.

The keyboard unit 33 includes a keyboard matrix 331 electrically connected to the control module 321. The keyboard matrix 331 is configured to sense the external tap behavior A, to enable the control module 321 to control the personal computer 2. The keyboard matrix 331 is an average keyboard, and may be used for entering a text instruction for the personal computer 2.

The auxiliary unit 34 includes at least one auxiliary key 341 electrically connected to the control module 321, an auxiliary scroll wheel 342 electrically connected to the control module 321, and an auxiliary thumbstick 343 electrically connected to the control module 321. The auxiliary key 341, the auxiliary scroll wheel 342, and the auxiliary thumbstick 343 are configured to sense the external tap behavior A, to enable the control module 321 to control the personal computer 2.

Preferably, the auxiliary key 341 is two keys provided below the touchpad 311, to respectively simulate left and right buttons of a mouse, and cooperate with the touchpad 311, to serve as a simulated mouse. The auxiliary scroll wheel 342 may send an instruction for sliding upward or downward to the personal computer 2. The auxiliary thumbstick 343 may send a moving instruction to the personal computer 2. During actual implementation, the touchpad 311 may be merely provided in the operation and control apparatus to operate and control the computer apparatus (e.g., personal computer 2). The present invention should not be limited to the example in the preferred embodiment.

Figure 3:
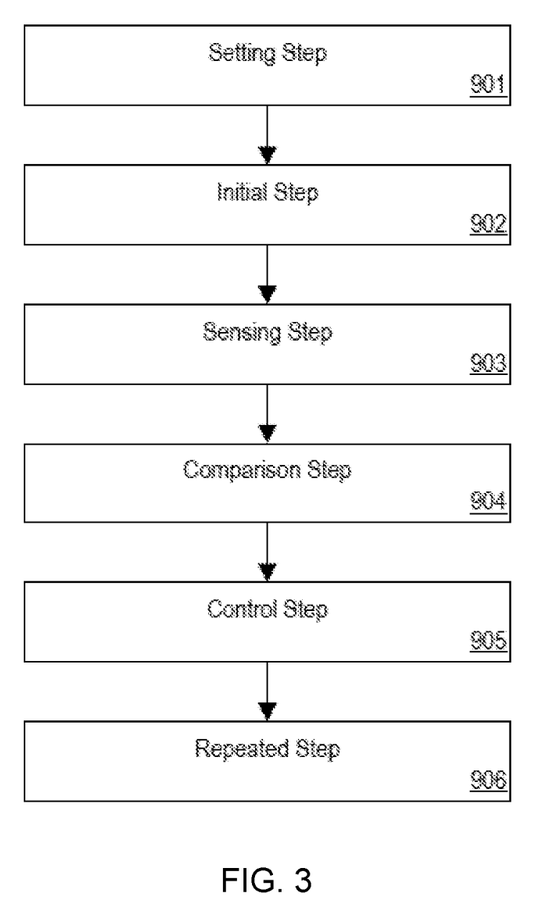
FIG. 3 is a flowchart, illustrating a control method according to the preferred embodiment.

FIG. 3 is a control method for the preferred embodiment. The method is used for operating and controlling the personal computer 2, so that the operation and control apparatus senses the external tap behavior A. The method includes a setting step 901, an initial step 902, a sensing step 903, a comparison step 904, a control step 905, and a repeated step 906.

This setting step 901 is first performed to select a simulated operation and control mode based on a definition of a user. In the preferred embodiment, the simulated operation and control modes that the control module 321 can select include a stimulated mouse operation and control mode, a stimulated thumbstick operation and control mode, and a stimulated steering wheel operation and control mode. As a non-limiting example, a user can select, via a user interface, to cause the control module 321 to select either a stimulated mouse operation and control mode, a stimulated thumbstick operation and control mode, or a stimulated steering wheel operation and control mode.

Preferably, the control module 321 has a setting interface for the personal computer 2. The user may use the setting interface to set parameters for the operation and control apparatus, and select an operation mode for the operation and control apparatus. The user selects one of the following: a mouse operation and control mode, a thumbstick operation and control mode, and a steering wheel operation and control mode by means of the personal computer 2. During actual implementation, the control module 321 may alternatively be a physical selection key, and the user may directly use the physical selection key to select an operation mode for the touchpad 311. The present invention should not be limited thereto.

The initial step 902 is then performed to virtualize at least one initial coordinate 41 at the operation and control apparatus.

When the user selects the simulate mouse operation and control mode, the initial coordinate 41 is used for storing the previous tap coordinate 43, to determine a basis point that the external tap behavior A moves on the touchpad 311.

When the user selects the simulated thumbstick operation and control mode, the initial coordinate 41 is used for storing a central point coordinate 45, to determine a distance and an orientation of the external tap behavior A relative to the central point coordinate 45.

When the user selects the simulated steering wheel operation and control mode, the initial coordinate 41 is used for storing a central axis coordinate 46, to determine a distance and an angle of the external tap behavior A relative to the central axis coordinate 46.

The sensing step 903 is then performed, the operation and control apparatus senses the external tap behavior A to generate tap information 42, and the control module 321 generates the tap coordinate 43 by using the tap information 42.

When the user selects the simulated mouse operation and control mode, a value of the analyzed tap coordinate 43 is stored in the initial coordinate 41, so that the initial coordinate 41 may be used for determining that the external tap behavior A moves in real time in the touchpad 311.

When the user selects the simulated thumbstick operation and control mode, a coordinate of the external tap behavior A tapping the touchpad 311 for the first time is used as the initial coordinate 41, that is, the central point coordinate 45. During actual implementation, the center coordinate of the touchpad 311 may be used as the initial coordinate 41. The present invention should not be limited thereto.

When the user selects the simulated steering wheel operation and control mode, a coordinate of a vertical line of the coordinate of the external tap behavior A tapping the touchpad 311 for the first time is used as the initial coordinate 41, that is, the central axis coordinate 46 is used as the base point for analyzing the tap coordinate 43. During actual implementation, the center coordinate of the touchpad 311 may also be used as the initial coordinate 41. The present invention should not be limited thereto.

The comparison step 904 is then performed. In all the simulated mouse operation and control mode, the simulated thumbstick operation and control mode, and the simulated steering wheel operation and control mode, a relative position of the tap coordinate 43 is analyzed by using the initial coordinate 41 as the base point, to generate a control instruction 44 to control the personal computer 2.

For example, when the user selects the simulated mouse operation and control mode, storing the initial coordinate 41 of the previous tap coordinate 43 can analyze a new orientation and distance of a new tap coordinate 43, to generate the control instruction 44.

When the user selects the simulated thumbstick operation and control mode, storing the initial coordinate 41 of the coordinate of the external tap behavior A tapping the touchpad 311 for the first time, that is, the central point coordinate 45 can analyze the orientation and distance of the new tap coordinate 43, to generate the control instruction 44.

When the user selects the simulated steering wheel operation and control mode, storing the initial coordinate 41 of the coordinate of the external tap behavior A tapping the touchpad 311 for the first time, that is, the central axis coordinate 46 can analyze the angle or distance of the new tap coordinate 43, to generate the control instruction 44.

The control step 905 is then performed to operate and control the personal computer 2 by using the control instruction 44. For example, a movement of the mouse of the computer or a picture of the computer may be controlled in a simulated mouse operation and control mode; and a game on the personal computer 2 may be controlled by simulating a thumbstick in a simulated thumbstick operation and control mode; and the game on the personal computer 2 may be controlled by simulating a steering wheel in a simulated steering wheel operation and control mode.

Finally, the repeated step 906 is performed, and after a time interval, the sensing step 903 is performed again. The time interval needs to be fixed to distinguish a moving distance or a rotation angle per unit time to send the control instruction 44 to the personal computer 2. A shorter interval time indicates a higher game operation and control resolution of the personal computer 2. In this way, the operation and control apparatus may control the personal computer 2 more precisely.

When the user selects the simulated mouse operation and control mode, the compared tap coordinate 43 is stored in the initial coordinate 41 as reference for next comparison. When the user selects the simulated thumbstick operation and control mode or the simulated steering wheel operation and control mode, the initial coordinate 41 is a coordinate where the external tap behavior A first taps the touchpad 311 until the external tap behavior A leaves the touchpad 311.

Figure 4:
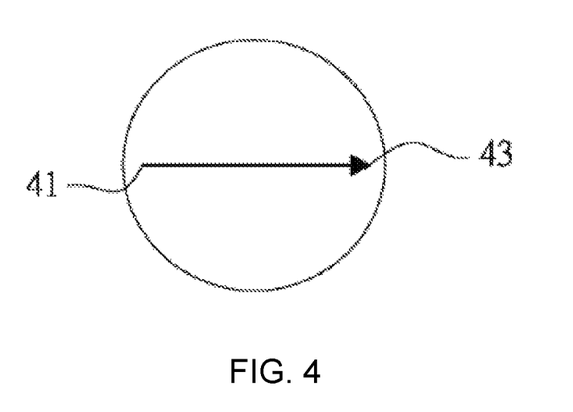
FIG. 4 is a schematic diagram, illustrating a pattern for mouse simulation according to the preferred embodiment.

FIG. 4 is a schematic diagram showing that the user selects the simulated mouse operation and control mode. In the comparison step 904, the tap coordinate 43 may alternatively be the initial coordinate 41, and the control instruction 44 is generated by using the initial coordinate 41 as a base point, that is, the compared tap coordinate 43 is stored in the initial coordinate 41, so as to analyze new tap coordinate 43 after a time interval. In the control step 905, the mouse operation and control mode is simulated by using the control instruction 44.

FIG. 5 is a schematic diagram showing that the user selects the simulated thumbstick operation and control mode. In the initial step 902, the initial coordinate 41 is the central point coordinate 45, but in the comparison step 904, especially when a coordinate at which the external tap behavior A taps the touchpad 311 for the first time is used as the initial coordinate 41, the tap coordinate 43 is analyzed by using the central point coordinate 45. In this way, a distance and an orientation of the tap coordinate 43 relative to the central point coordinate 45 are the control instruction 44. In the control step 905, the thumbstick operation and control mode is simulated by using the control instruction 44.

FIG. 6 is a schematic diagram showing that the user selects the simulated steering wheel operation and control mode. In the initial step 902, the initial coordinate 41 is the central axis coordinate 46, but in the comparison step 904, especially when a coordinate at which the external tap behavior A taps the touchpad 311 for the first time is used as the initial coordinate 41, the tap coordinate 43 is analyzed by using the central axis coordinate 46. In this way, the tap coordinate 43 relative to the central axis coordinate 46 is the control instruction 44, and an angle and a distance of the tap coordinate 43 relative to the central axis coordinate 46 is especially analyzed. In the control step 905, the steering wheel operation and control mode is simulated by using the control instruction 44.

It should be noted that in the simulated mouse operation and control mode, a compared tap coordinate 43 is stored in the initial coordinate 41. Therefore, when the external tap behavior A does not move, a value of the tap coordinate 43 is the same as that of the initial coordinate 41. That is, a mouse position of the personal computer 2 does not move. When the external tap behavior A moves, the value of the tap coordinate 43 starts to be different from that of the initial coordinate 41, so that the mouse position of the personal computer 2 is changed in real time.

In the simulated thumbstick operation and control mode and the simulated steering wheel operation and control mode, the initial coordinate 41 is a coordinate at which the external tap behavior A taps the touchpad 311 for the first time. Until the external tap behavior A leaves the touchpad 311, the initial coordinate 41 remains unchanged. Therefore, the tap coordinate 43 is not equal to the initial coordinate 41, and when the external tap behavior A continues on the touchpad 311, even if a position of the tap coordinate 43 is not changed, the control instruction 44 may continuously operate and control the personal computer 2, to change a direction in a game in the personal computer 2.

It may be learned from the above that the operation and control apparatus and the control method therefor in the present invention actually have the following effects:

1. Simulate a Thumbstick:

The control module 321 virtualizes the central point coordinate 45 of the touchpad 311, then analyzes an orientation and a distance of the tap coordinate 43 relative to the central point coordinate 45, so that the control module 321 generates the control instruction 44, to simulate a thumbstick to control the personal computer 2.

2. Simulate a Steering Wheel:

The control module 321 virtualizes the central axis coordinate 46 of the touchpad 311, then analyzes an angle or a distance of the tap coordinate 43 relative to the central axis coordinate 46, so that the control module 321 generates the control instruction 44, to simulate a steering wheel to control the personal computer 2.

3. Simulate a Mouse:

The control module 321 obtains a moving coordinate of the tap information 42 on the touchpad 311, and generates the control instruction 44, so that a picture of the personal computer 2 moves in real time based on the tap information 42, or a simulated mouse controls the mouse position of the personal computer 2.

4. Select an Operation and Control Mode:

The control module 321 may set a parameter. A user may select a control mode of the operation and control apparatus by using the control module 321, so that the touchpad 311 of the operation and control apparatus may select an operation and control mode: a simulated mouse, a simulated thumbstick, and a simulated steering wheel, to operate and control the personal computer 2.

Based on the above, the control module 321 may provide operation and control mode selection for the user, and the virtualized initial coordinate 41 of the touchpad 311 is stored in the memory module 322. The touchpad 311 senses the external tap behavior A to generate the tap information 42, and the control module 321 generates the tap coordinate 43. The control module 321 analyzes, based on the operation and control mode selected by the user, the position and distance of the tap coordinate 43 relative to the initial coordinate 41, to generate the control instruction 44 to control the personal computer 2. Therefore, a purpose of the present invention can be actually achieved.

The foregoing is only the preferred embodiment of the present invention, and should not limit the implementation scope of the present invention. In other words, all simple and equivalent changes and modifications made based on the patent scope and description content in the application of the present invention fall within the scope of the patent of the present invention

What is claimed is:

1. An operation and control apparatus electrically connected to a personal computer, used for sensing an external tap behavior to operate and control the personal computer, the apparatus comprising:

a touch unit including a touchpad configured to sense the external tap behavior; and a control unit including a control module electrically connected to the touchpad, and a memory module electrically connected to the control module;

wherein the operation and control apparatus is configured to perform:

a setting step of selecting a simulated operation and control mode based on a definition from a user;

an initializing step of virtualizing at least one initial coordinate on the operation and control apparatus, wherein the memory module is configured to store the at least one initial coordinate;

a sensing step of sensing, by the touchpad of the operation and control apparatus, the external tap behavior to generate tap information;

obtaining, by the control module, the external tap behavior sensed by the touchpad and recording a position of the tap information to generate a tap coordinate, wherein the at least one initial coordinate is one of the tap coordinate, a central point coordinate, and a central axis coordinate;

a comparison step of analyzing, by the control module, a position of the tap coordinate by using the at least one initial coordinate as a basis point, and generating a control instruction for operating and controlling the personal computer; and a control step of operating and controlling the personal computer by using the control instruction.

2. The operation and control apparatus according to claim 1, wherein the operation and control apparatus is configured to perform a repeated step, after the control step, of performing the sensing step again after a time interval.

3. The operation and control apparatus according to claim 1, wherein:

in the comparison step, the tap coordinate is the at least one initial coordinate, and the control instruction is generated by using the at least one initial coordinate as the basis point; and in the control step, a mouse operation and control mode is simulated by using the control instruction.

4. The operation and control apparatus according to claim 3, wherein in the setting step, the user selects one of the mouse operation and control mode, a thumbstick operation and control mode, and a steering wheel operation and control mode by using the personal computer.

5. The operation and control apparatus according to claim 1, further comprising a keyboard unit, comprising a keyboard matrix electrically connected to the control module, wherein the keyboard matrix is configured to sense the external tap behavior, to enable the control module to control the personal computer.

6. The operation and control apparatus according to claim 1, further comprising an auxiliary unit, comprising at least one auxiliary key electrically connected to the control module, an auxiliary scroll wheel electrically connected to the control module, and an auxiliary thumbstick electrically connected to the control module, wherein the auxiliary key, the auxiliary scroll wheel, and the auxiliary thumbstick are configured to sense the external tap behavior, to enable the control module to control the personal computer.

7. A control method for an operation and control apparatus, used for sensing an external tap behavior to operate and control a personal computer, and comprising the following steps:

a setting step of selecting a simulated operation and control mode based on a definition of a user;

an initializing step of virtualizing at least one initial coordinate on the operation and control apparatus, wherein the at least one initial coordinate is a central point coordinate;

a sensing step of sensing, by the operation and control apparatus, the external tap behavior to generate tap information, and recording a position of the tap information to generate a tap coordinate;

a comparison step of analyzing a position of the tap coordinate by using the at least one initial coordinate as a basis point, and generating a control instruction, wherein the tap coordinate relative to the central point coordinate is used as the control instruction; and a control step of operating and controlling the personal computer by using the control instruction, wherein a thumbstick operation and control mode is simulated by using the control instruction.

8. The control method for an operation and control apparatus according to claim 7, wherein in the setting step, the user selects one of a mouse operation and control mode, the thumbstick operation and control mode, and a steering wheel operation and control mode by using the personal computer.

9. A control method for an operation and control apparatus, used for sensing an external tap behavior to operate and control a personal computer, and comprising the following steps:

a setting step of selecting a simulated operation and control mode based on a definition of a user;

an initializing step of virtualizing at least one initial coordinate on the operation and control apparatus, wherein the at least one initial coordinate is a central axis coordinate;

a sensing step of sensing, by the operation and control apparatus, the external tap behavior to generate tap information, and recording a position of the tap information to generate a tap coordinate;

a comparison step of analyzing a position of the tap coordinate by using the at least one initial coordinate as a basis point, and generating a control instruction, wherein the tap coordinate relative to the central axis coordinate is used as the control instruction; and a control step of operating and controlling the personal computer by using the control instruction, wherein a steering wheel operation and control mode is simulated by using the control instruction.

10. The control method for an operation and control apparatus according to claim 9, wherein in the setting step, the user selects one of a mouse operation and control mode, a thumbstick operation and control mode, and the steering wheel operation and control mode by using the personal computer.

* * * * *